United States Patent
Grelin et al.

(10) Patent No.: US 11,549,400 B2
(45) Date of Patent: Jan. 10, 2023

(54) FIBER TEXTURE FOR A CASING MADE OF COMPOSITE MATERIAL WITH IMPROVED SHEAR RESISTANCE

(71) Applicants: SAFRAN, Paris (FR); SAFRAN AIRCRAFT ENGINES, Paris (FR)

(72) Inventors: Hervé Grelin, Moissy-Cramayel (FR); François Charleux, Moissy-Cramayel (FR); Dominique Marie Christian Coupe, Moissy-Cramayel (FR)

(73) Assignees: SAFRAN, Paris (FR); SAFRAN AIRCRAFT ENGINES, Paris (FR)

( * ) Notice: Subject to any disclaimer, the term of this patent is extended or adjusted under 35 U.S.C. 154(b) by 189 days.

(21) Appl. No.: 17/262,077

(22) PCT Filed: Jul. 18, 2019

(86) PCT No.: PCT/FR2019/051806
§ 371 (c)(1),
(2) Date: Jan. 21, 2021

(87) PCT Pub. No.: WO2020/021184
PCT Pub. Date: Jan. 30, 2020

(65) Prior Publication Data
US 2021/0164364 A1 Jun. 3, 2021

(30) Foreign Application Priority Data

Jul. 23, 2018 (FR) ...................................... 1856795

(51) Int. Cl.
*F01D 25/24* (2006.01)
*D03D 1/00* (2006.01)
(Continued)

(52) U.S. Cl.
CPC ........... *F01D 25/24* (2013.01); *D03D 1/0035* (2013.01); *D03D 11/00* (2013.01); *D03D 25/005* (2013.01);
(Continued)

(58) Field of Classification Search
CPC .. D03D 1/0035; D03D 1/0052; D03D 15/267; D03D 25/005; D10B 2101/12;
(Continued)

(56) References Cited

U.S. PATENT DOCUMENTS 5,100,713 A * 3/1992 Homma ............... D03D 13/002
428/113
5,538,781 A 7/1996 Rao et al.
(Continued)

FOREIGN PATENT DOCUMENTS

CN 101713115 A 5/2010
CN 104395515 A 3/2015
(Continued)

OTHER PUBLICATIONS

International Search Report as issued in International Patent Application No. PCT/FR2019/051806, dated Nov. 15, 2019.

*Primary Examiner* — Courtney D Heinle
*Assistant Examiner* — Danielle M. Christensen
(74) *Attorney, Agent, or Firm* — Pillsbury Winthrop Shaw Pittman LLP (57) ABSTRACT

A fibrous texture in the form of a web includes a first portion extending in a longitudinal direction between a proximal part and an intermediate part. One or more layers of warp threads or strands present on the side of an inner face of the fibrous texture include threads or strands of glass fibers, the threads or strands of the other layers of warp threads or strands including threads or strands of carbon fibers. The fibrous texture further includes a second portion extending (Continued)

in the longitudinal direction between the intermediate part and a distal part of the fibrous texture. One or more of the plurality of layers of warp threads or strands present on the side of an outer face of the fibrous texture include threads or strands of glass fibers. The warp threads or strands are continuous over the entire length of the fibrous texture.

12 Claims, 11 Drawing Sheets

(51) Int. Cl.
  D03D 11/00 (2006.01)
  D03D 25/00 (2006.01)
(52) U.S. Cl.
  CPC ...... *D10B 2101/06* (2013.01); *D10B 2101/12* (2013.01); *D10B 2505/02* (2013.01); *D10B 2505/12* (2013.01); *F05D 2220/32* (2013.01); *F05D 2230/50* (2013.01); *F05D 2300/614* (2013.01)

(58) Field of Classification Search
  CPC ............. D10B 2505/12; F05D 2230/50; F05D 2300/614
  See application file for complete search history.

(56) References Cited

U.S. PATENT DOCUMENTS

| | | | |
|---|---|---|---|
| 10,655,250 B2* | 5/2020 | Lorrillard | ............ D03D 41/004 |
| 11,306,608 B2* | 4/2022 | Marin | ...................... F01D 25/24 |

FOREIGN PATENT DOCUMENTS

| | | |
|---|---|---|
| CN | 107250450 A | 10/2017 |
| EP | 2 372 000 A1 | 10/2011 |
| FR | 2 706 913 A1 | 12/1994 |
| WO | WO 2006/136755 A2 | 12/2006 |
| WO | WO 2017/109403 A1 | 6/2017 |

\* cited by examiner

FIBER TEXTURE FOR A CASING MADE OF COMPOSITE MATERIAL WITH IMPROVED SHEAR RESISTANCE

CROSS-REFERENCE TO RELATED APPLICATIONS

This application is the U.S. National Stage of PCT/FR2019/051806, filed Jul. 18, 2019, which in turn claims priority to French patent application number 1856795 filed Jul. 23, 2018. The content of these applications are incorporated herein by reference in their entireties.

BACKGROUND OF THE INVENTION

The present invention relates to a fibrous texture that can be used, particularly but not exclusively, to form the fibrous reinforcement of an aircraft engine blower casing made of composite material.

The manufacture of a casing made of composite material begins with the production of a fibrous texture in the form of a web, the fibrous texture being produced by three-dimensional weaving between a plurality of layers of warp threads and a plurality of layers of weft threads. The fibrous texture thus obtained is wound in several turns on a mold or tool having the shape of the casing to be made and held between the mold and segments forming a counter-mold so as to obtain a fibrous preform.

Once the fibrous preform is produced, i.e., at the end of the winding of the fibrous texture, the tool carrying the fibrous preform is closed by counter-molds then transported to an oven or furnace in which the densification of the preform by a matrix is carried out, the matrix which can be obtained in particular by injection and polymerization of a resin in the fibrous preform.

A blower casing has three main functions, namely:
to provide the connection of engine parts to each other,
to define the air inlet vein into the engine,
to provide containment by trapping ingested debris inside the engine, or centrifugally projected blades or blade fragments, in order to prevent them from passing through the casing and reaching other parts of the aircraft.

The first two functions are not very demanding in terms of mechanical properties but are permanently active. On the other hand, the third function, even if it is used very little, is very demanding in terms of mechanical properties.

During a fan blade out (FBO) event, the event can split into different phases for the casing:
Phase 1: contact between the blade and the casing,
Phase 2: shearing by the leading edge of the lost blade from the casing material,
Phase 3: deformation of the casing under the effect of high energy,
Phase 4: restoration of the energy stored in the casing linked to the fragment of the lost blade,
Phase 5: establishment of windmilling.

During phase 1, the casing is required to have a high degree of stiffness in order to deform as little as possible under the effect of contact with the blade. During this phase energy is stored by the casing in the form of deformation.

During phase 2, the casing material must show shear properties. The material is sheared and the energy is dissipated by this shear.

During phase 3, the projectile penetrates the casing with greater difficulty and the energy stored by the projectile is fully absorbed by the deformation of the casing. During this phase, a high rate of deformation is required of the casing material.

During phase 4, the energy is restored by deformation of the casing to return to the initial geometry.

During phase 5, the casing is subjected to fatigue stress with high mechanical loading.

The casings of the state of the art generally provide this function in a satisfactory manner. It remains possible, however, to further improve the mechanical resistance of some casings to impact with a projectile, in particular with a blade when it detaches and is projected onto the casing.

An example of a blower casing made of composite material with a reinforced retention zone is described in particular in the document WO 2017/109403.

OBJECT AND SUMMARY OF THE INVENTION

The invention relates, according to a first aspect, to a fibrous texture in the form of a web extending in a longitudinal direction over a determined length between a proximal part and a distal part and in a lateral direction over a determined width between a first lateral edge and a second lateral edge, the fibrous texture having a three-dimensional or multilayer weave between a plurality of layers of warp threads or strands extending in the longitudinal direction and a plurality of layers of weft threads or strands extending in the lateral direction, characterized in that the fibrous texture comprises a first portion present in the longitudinal direction between the proximal part and an intermediate part, one or more layers of warp threads or strands present on the side of an inner face of the fibrous texture at least partly comprising threads or strands of glass fibers, the threads or strands of the other layers of warp threads or strands comprising threads or strands of carbon fibers, and in that the fibrous texture further comprises a second portion present in the longitudinal direction between the intermediate part and the distal part of said fibrous texture, one or more layers of the plurality of layers of warp threads or strands present on the side of an outer face of the fibrous texture at least partly comprising threads or strands of glass fibers, the threads or strands of the other layers of the plurality of layers of warp threads or strands comprising threads or strands of carbon fibers, the warp threads or strands being continuous over the entire length of the fibrous texture.

The fibrous texture is intended to be wound in several turns to form a fibrous reinforcement for a composite casing. The first portion is intended to form the radially inner part of this fibrous reinforcement (first turn(s) of the winding). The second portion is intended to form the radially outer part of this fibrous reinforcement (last turn(s) of the winding).

The inventors noticed that it was possible to improve the resistance of the casing to impact, for example with a detached blade, by judicious placement of threads or strands of glass fibers among the threads or strands of carbon fibers in the fibrous texture. Indeed, threads or strands of glass fibers have a much higher shear strength and elongation resistance than threads or strands of carbon fibers. Thus, the fibrous texture according to the invention comprises glass fiber warp threads or strands in the first portion intended to form the beginning of the winding and located on the side of the impact with the blade (layers of warp threads or strands located on the side of the inner face of the fibrous texture), in order to confer greater shear strength to this first portion. This limits the penetration depth of a projectile, for example a blade or blade part, impacting the inner surface of the casing. A larger portion of the casing material is thus preserved, which makes it possible to effectively manage the phases described above (in particular phases 2 to 5) during a loss of blade or blade fraction event.

The other layers of warp threads or strands in the first portion are constituted of threads or strands of carbon fibers in order to retain a good stiffness in this first portion and to limit the impact of the use of threads or strands of glass fibers, these having a higher mass than threads or strands of carbon fibers.

Moreover, the fibrous texture according to the invention comprises warp threads or strands of glass fibers in the second portion, which is intended to form the outer layer(s) of the winding. In the second portion, the warp threads or strands of glass fibers are present on the side of the outer face of the fibrous texture. The high rate of deformation of the glass fiber, higher than that of the carbon fiber, makes it possible to confer a significant elastic deformation capacity on this second portion, and thus to be able to absorb the energy communicated by the blade by deforming and then to restore this energy to the blade by returning to its initial shape (phases 3 and 4).

The other layers of warp threads or strands in the second portion are constituted of threads or strands of carbon fibers in order to retain a good stiffness in this second portion and to limit the impact of the use of threads or strands of glass fibers, which have a higher mass than threads or strands of carbon fibers.

The invention therefore rests on the use of two different materials, namely carbon and glass, located in particular zones of the fibrous reinforcement, in order to respond, in an optimal manner, to the stresses of the casing during an impact event, for example a loss of blade or blade fraction, while limiting the mass of the latter.

According to a particular aspect of the invention, the warp threads or strands of glass fibers present on the side of the inner face of the fibrous texture in the first portion gradually rise toward the outer face of the fibrous texture in the intermediate part so as to be present on the side of the outer face of said texture in the second portion. The warp threads or strands are thus continuous over the entire length of the fibrous texture, which makes it possible to preserve the mechanical properties conferred by three-dimensional or multilayer weaving (in particular resistance to delamination and transmission of stresses) throughout the fibrous reinforcement.

In an example embodiment, one or more layers of the plurality of layers of weft threads or strands present on the side of the inner face of the fibrous texture in the first portion are constituted of threads or strands of glass fibers, the threads or strands of the other layers of the plurality of layers of weft threads or strands being constituted of threads or strands of carbon fibers. Where necessary, the shear strength can be further increased in the first portion of the fibrous texture by using weft threads or strands of glass fibers at the level of the warp threads or strands of glass fibers.

In an example embodiment, one or more layers of the plurality of layers of weft threads or strands present on the outer face of the fibrous texture in the second portion are constituted of threads or strands of glass fibers, the threads or strands of the other layers of the plurality of layers of weft threads or strands being constituted of threads or strands of carbon fibers. Where necessary, the deformation capacity can be further increased in the second portion of the fibrous texture by using weft threads or strands of glass fibers at the level of the warp threads or strands which are also made of glass fibers.

The invention is also aimed at a fibrous preform for an aircraft casing comprising a winding in several turns of a fibrous texture as described above, the first portion being located on the side of a radially inner face of the preform, and the second portion being located on the side of a radially outer face of the preform.

The invention is also aimed at a gas turbine casing made of a composite material, comprising a fibrous reinforcement consisting of a fibrous preform as described above, and a matrix densifying the fibrous reinforcement.

In an example embodiment, said casing is a gas turbine blower casing.

The invention is also aimed at an aircraft gas turbine engine having a casing as described above.

The invention further relates to a process for manufacturing a fibrous texture by three-dimensional or multilayer weaving between a plurality of layers of warp threads or strands extending in a longitudinal direction and a plurality of layers of weft threads or strands extending in the lateral direction, the fibrous structure in the form of a web extending in the longitudinal direction over a determined length between a proximal part and a distal part and in the lateral direction over a determined width between a first lateral edge and a second lateral edge, characterized in that it comprises weaving a first portion present in the longitudinal direction between the proximal part and an intermediate part, one or more layers of warp threads or strands present on the side of an inner face of the fibrous texture at least partly comprising threads or strands of glass fibers, the threads or strands of the other layers of warp threads or strands comprising threads or strands of carbon fibers, and in that it further comprises weaving a second portion present in the longitudinal direction between the intermediate part and the distal part of said fibrous texture, one or more layers of the plurality of layers of warp threads or strands present on the side of an outer face of the fibrous texture at least partly comprising threads or strands of glass fibers, the threads or strands of the other layers of the plurality of layers of warp threads or strands comprising threads or strands of carbon fibers, the warp threads or strands being continuous over the entire length of the fibrous texture.

According to a particular aspect of the invention, the warp threads or strands of glass fibers present on the side of the inner face of the fibrous texture in the first portion gradually rise toward the outer face of the fibrous texture in the intermediate part so as to be present on the side of the outer face of said texture in the second portion.

In an example embodiment, one or more layers of the plurality of layers of weft threads or strands present on the side of the inner face of the fibrous texture in the first portion are constituted of threads or strands of glass fibers, the threads or strands of the other layers of the plurality of layers of weft threads or strands being constituted of threads or strands of carbon fibers.

In an example embodiment, one or more layers of the plurality of layers of weft threads or strands present on the outer face of the fibrous texture in the second portion are constituted of threads or strands of glass fibers, the threads or strands of the other layers of the plurality of layers of weft threads or strands being constituted of threads or strands of carbon fibers.

BRIEF DESCRIPTION OF THE DRAWINGS

Other features and advantages of the invention will emerge from the following description, given on a non-limiting basis, with reference to the appended drawings, on which.

DETAILED DESCRIPTION OF EMBODIMENTS

The invention is generally applicable to fibrous textures intended for the manufacture of casings made of composite material, these casings comprising a barrel or shell with annular flanges at their ends.

Figure 1:
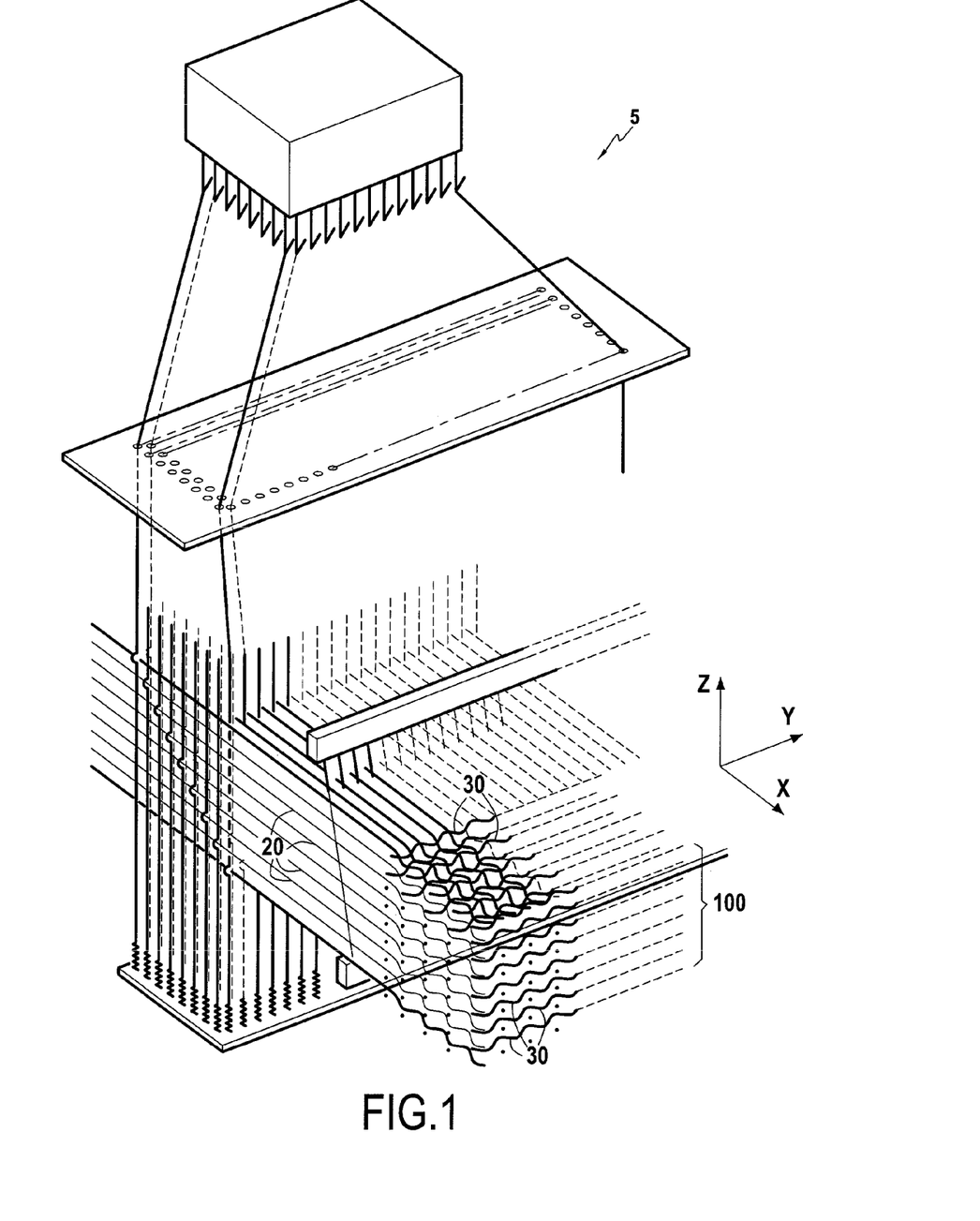
FIG. 1 is a schematic perspective view of a loom showing the three-dimensional weaving of a fibrous texture.

As shown in FIG. 1, a fibrous texture 100 is produced in a known way by weaving using a jacquard type loom 5 on which is arranged a bundle of warp threads or strands 20 in a plurality of layers, the warp threads being bound by weft threads or strands 30.

The fibrous texture is produced by three-dimensional weaving. As used here, "three-dimensional weaving" or "3D weaving" refers to a weaving method in which at least some of the weft threads interlink warp threads with several layers of warp threads or vice versa. The fibrous texture may have an interlock weave. As used here, "interlock" weave means a weave in which each layer of weft threads interlinks several layers of warp threads, with all of the threads in the same weft column having the same movement in the weave plane. Other weaves can be considered.

Figure 2:
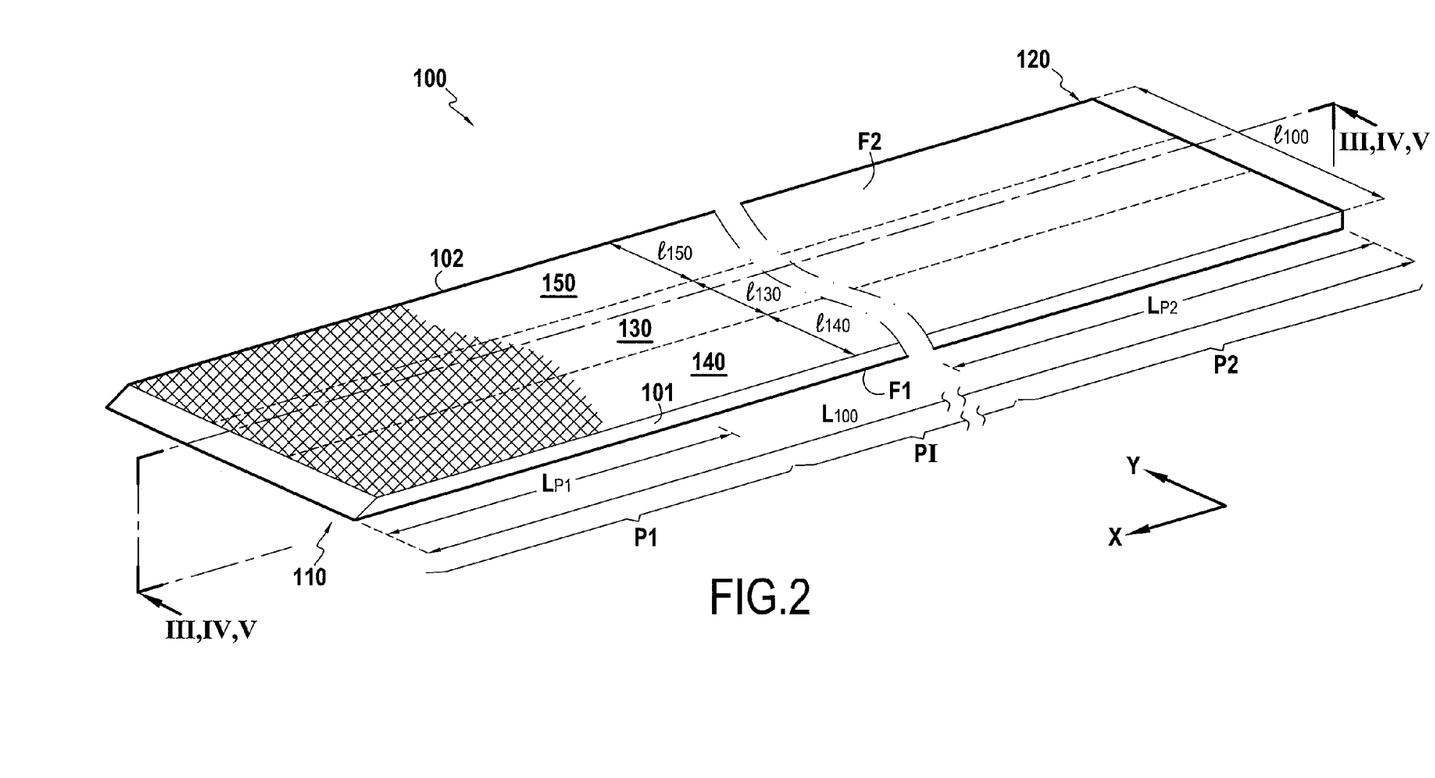
FIG. 2 is a schematic perspective view of a fibrous texture in accordance with an embodiment of the invention.

As shown in FIG. 2, the fibrous texture 100 has the form of a web which extends lengthwise in a longitudinal direction X corresponding to the running direction of the warp threads or strands 20 and widthwise or transversely in a lateral direction Y between first and second side edges 101 and 102, the lateral direction Y corresponding to the direction of the weft threads or strands 30. The fibrous texture extends longitudinally over a determined length $L_{100}$ in the direction X between a proximal part 110 intended to form the beginning of the winding of a fibrous preform on a forming tool and a distal part 120 intended to form the end of the winding of the fibrous preform.

The fibrous texture also has a central zone 130 extending over a defined width $I_{130}$ in the direction Y, the central zone 130 being intended to form the barrel or shell of the casing. The central zone 130 is intended to be present opposite the blades and defines the retention zone of the casing to be obtained. The central zone 130 is set back from the first 101 and second 102 side edges and extends over a determined width $I_{130}$ less than the width $I_{100}$ of the texture 100. The central zone 130 is at an intermediate position between the first and second side edges 101 and 102. The central zone 130 is delimited between two lateral zones 140 and 150 each extending over a determined width, respectively $I_{140}$ and $I_{150}$, in the direction Y. The first lateral zone 140 extends between the first lateral edge 101 and the central zone 130. The second lateral zone 150 extends between the second lateral edge 102 and the central zone 130. Each of the lateral zones 140 and 150 is intended at least in part to form an annular flange of the casing.

The length $L_{100}$ of the fibrous texture 100 is determined according to the circumference of the forming tool or mold so as to allow the carrying out of a determined number of turns of the fibrous texture, for example four turns.

The fibrous texture 100 has a first portion P1 present between the proximal part 110 and an intermediate part PI of the fibrous texture. The first portion P1 is intended to form the first part of the winding forming the fibrous reinforcement of the casing (radially inner part of this winding, see FIG. 8 which shows the radial direction R). The intermediate part PI can be located halfway along the length of the fibrous texture 100, or more generally between one quarter and three quarters of the length of the fibrous texture 100, for example.

The fibrous texture 100 also comprises a second portion P2, distinct from the first portion P1, and present between the intermediate part PI and the distal part 120. The second portion P2 is intended to form the second part of the winding forming the fibrous reinforcement of the casing (radially outer part of this winding).

Figures 7, 8:
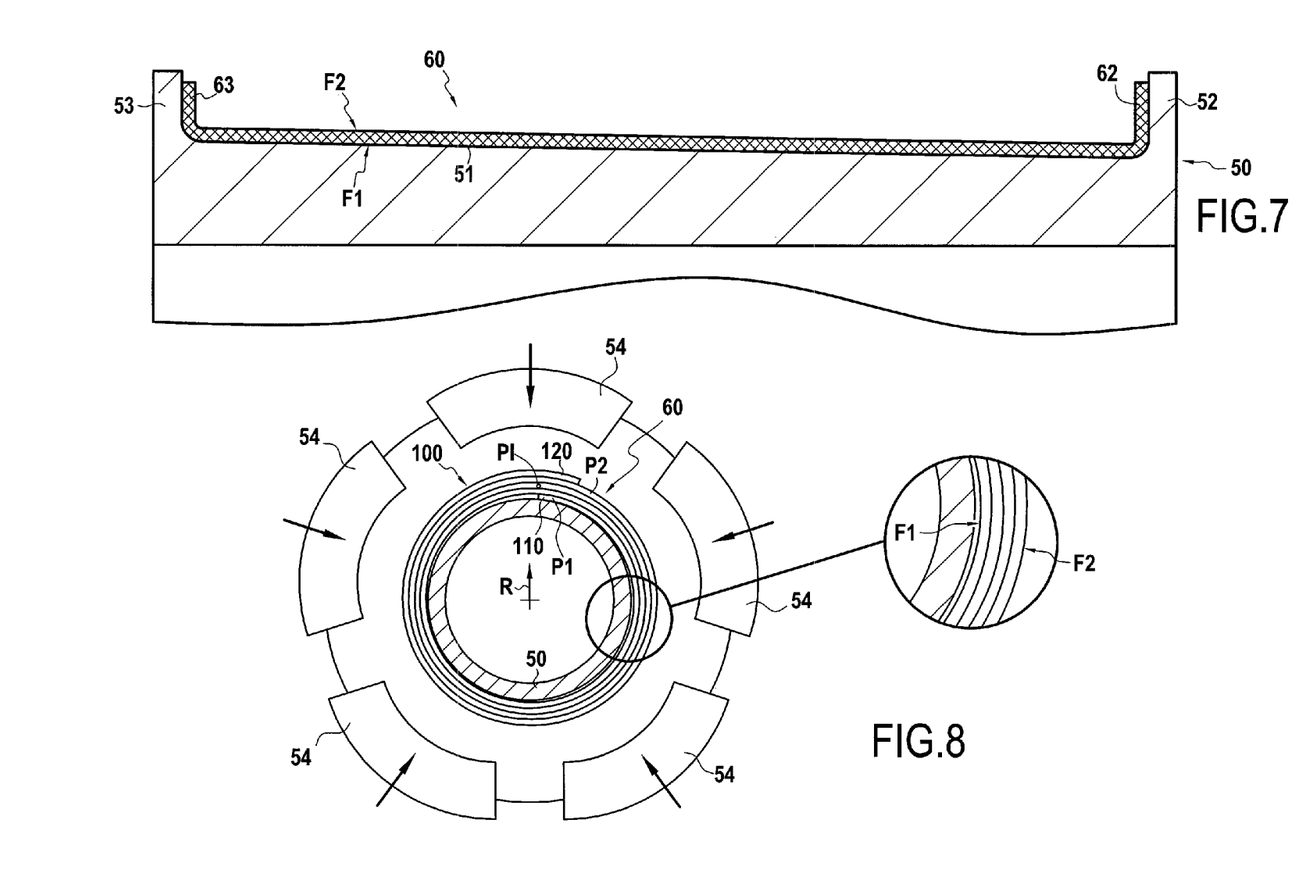
FIG. 7 is a half-view in axial section of a casing preform obtained by winding a fibrous texture as shown in FIG. 6.
FIG. 8 is a sectional view showing the positioning of injection sectors on the casing preform of FIG. 7.

In the example described here, the fibrous texture 100 extends over a length $L_{100}$ allowing four winding turns on the forming tool or mold. Still in the example described here, the first portion P1 extends over a length $L_{P1}$ defined to correspond to the first winding turn on the forming tool or mold (FIG. 8) whereas the second portion P2 extends over a length $L_{P2}$ defined to correspond to the last winding turn on the forming tool or mold (FIG. 8), the portion PI extending between the portions P1 and P2 over a length corresponding to the third and fourth winding turns on the forming tool or mold (FIG. 8).

Figure 3:
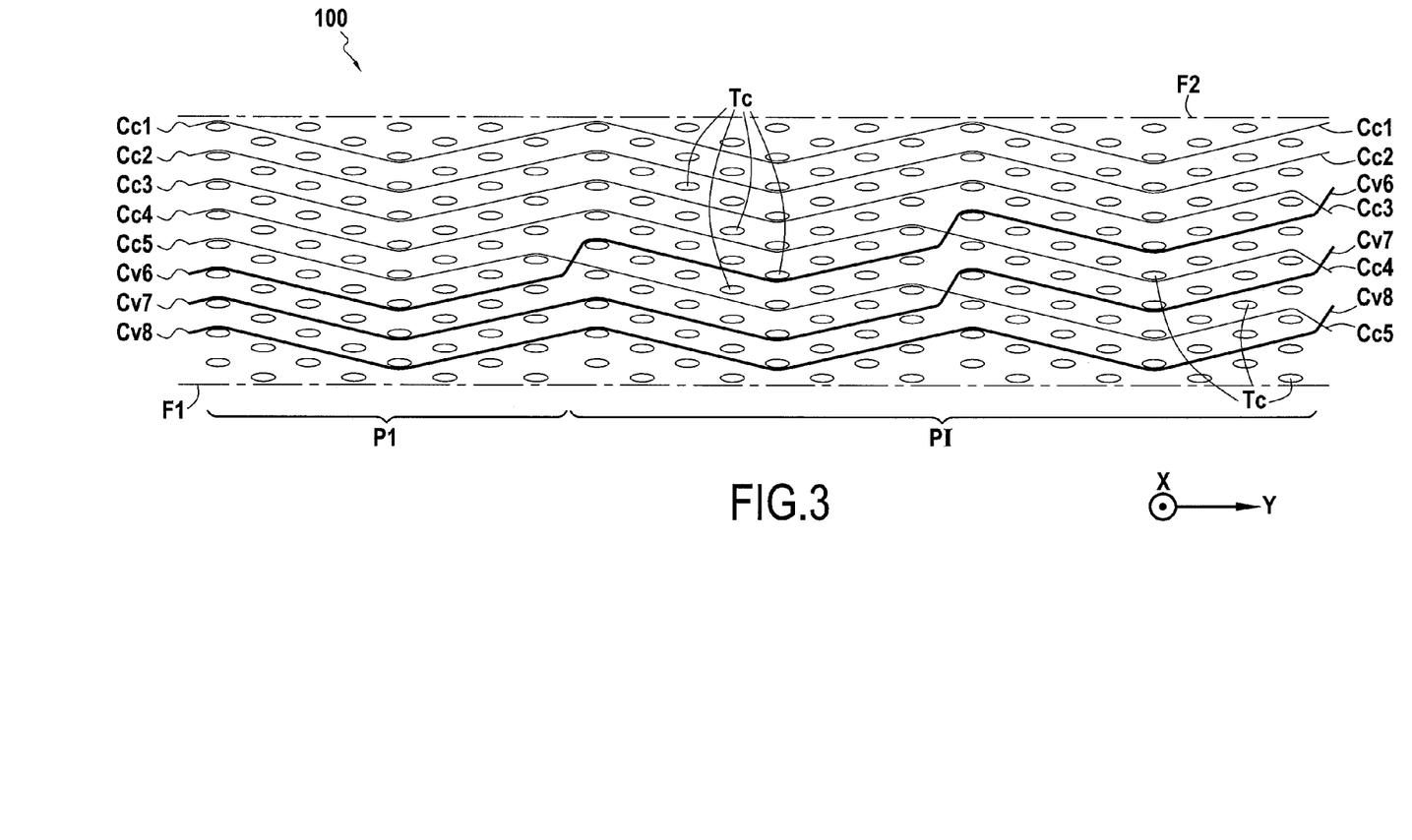
FIG. 3 is a longitudinal section taken at the first portion and part of the intermediate portion of the fibrous texture of FIG. 2 and showing a weave plane.
Figure 4:
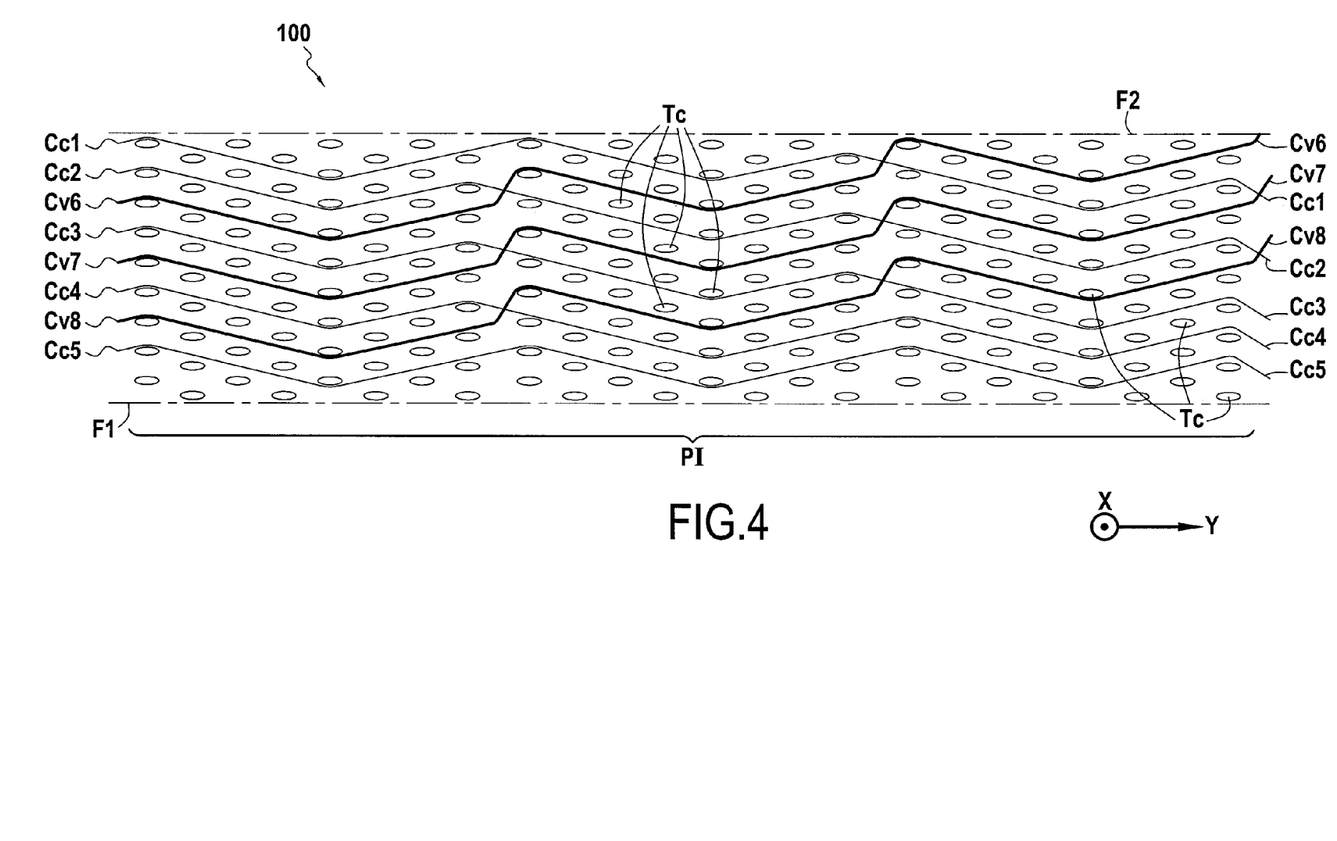
FIG. 4 is a longitudinal section taken at the intermediate portion of the fibrous texture of FIG. 2 and showing a weave plane.
Figure 5:
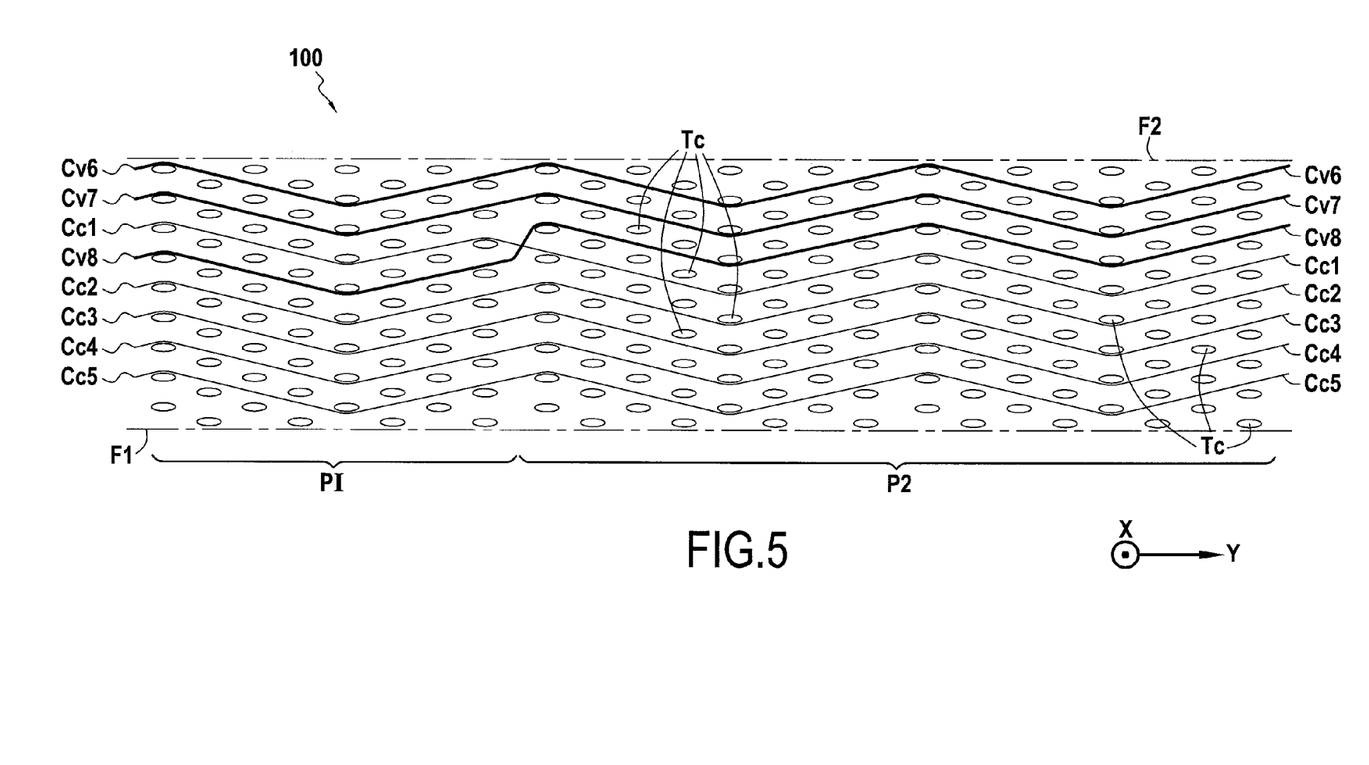
FIG. 5 is a longitudinal section taken at part of the intermediate portion and the second portion of the fibrous texture of FIG. 2 and showing a weave plane.

FIGS. 3 to 5 each illustrate a plane of the interlock weave of the fibrous texture 100 located respectively at the first portion P1, the intermediate portion PI and the second portion P2.

The examples of weave planes shown in FIGS. 3 to 5 comprise 9 layers of weft Tc and 8 layers of warp Cc1 to Cc5 and Cv6 to Cv8. In the interlock weave shown, a weft layer is formed by two adjacent weft half layers offset from each other in the weft direction. There are thus 18 half layers of weft positioned in staggered rows. Each warp layer interlinks 3 weft layers. It is also possible to adopt a non-staggered arrangement, with the warp threads of two adjacent warp layers aligned on the same columns. Interlock type weaves that can be used are described in the document WO 2006/136755.

In the example shown, the fibrous texture comprises warp threads or strands of glass fibers, denoted Cv6 to Cv8, as well as warp threads or strands of carbon fibers, denoted Cc1 to Cc5. The fibrous texture also comprises weft threads or strands of carbon fibers, denoted Tc.

As shown in FIG. 3, the first portion P1 comprises five layers of warp threads or strands present on the side of the outer face F2 of the fibrous texture 100 comprising threads or strands of carbon fibers Cc1 to Cc5 and three layers of warp threads or strands present on the side of the inner face F1 of the fibrous texture comprising threads or strands of carbon fibers Cv6 to Cv8.

Once in the intermediate portion PI, the weaving is piloted so as to make the warp threads or strands of glass fibers Cv6 to Cv8 gradually rise toward the outer face F2 of the fibrous texture by crossing with warp threads or strands of carbon fibers Cc1 to Cc5. In FIG. 3, the warp thread or strand of glass fiber Cv6 rises from two layers of weft threads or strands by successively crossing the warp threads or strands of carbon fibers Cc5 and Cc4 which, in turn, falls in the weft layers toward the inner surface F1 of the fibrous texture.

In FIG. 4, the warp threads or strands of glass fibers Cv6 to Cv8 toward the outer surface F2 continue to rise gradually toward the outer surface F2 of the fibrous texture while the warp threads or strands of carbon fibers Cc1 to Cc5 continue to fall gradually toward the inner surface F1 of the fibrous texture 100.

FIG. 5 shows the end of the intermediate portion PI where the warp threads or strands of glass fibers Cv6 to Cv8 are now present on the side of the outer face F2 of the fibrous texture 100. Thus, the second portion P2 comprises five layers of warp threads or strands present on the side of the inner face F1 of the fibrous texture 100 comprising the warp threads or strands of carbon fibers Cc1 to Cc5 and three layers of warp threads or strands present on the side of the outer face F2 of the fibrous texture 100 comprising the warp threads or strands of carbon fibers Cv6 to Cv8.

There is therefore an evolution of the nature of the warp threads or strands when moving along the longitudinal direction X of the fibrous texture 100.

An example has just been described in which the fibrous texture has an interlock weave with 9 weft layers and 8 warp layers. However, it is not beyond the scope of the invention when the number of weft and warp layers is different, or when the fibrous texture has a different weave than an interlock weave.

Furthermore, it is advantageous that the threads or strands of carbon fibers and the threads or strands of glass fibers present in the fibrous texture have a similar cross-section or volume. The ratio $|V2-V1|/V1$ can, for example, be less than or equal to 10%, where V1 denotes the volume of the threads or strands of carbon fibers, V2 denotes the volume of the threads or strands of glass fibers, and |.| denotes the absolute value.

The fibrous texture may comprise warp threads or strands of glass fibers only over a determined width in lateral direction Y. In particular, warp threads or strands of glass fibers may be used only in the central zone 130 of the fibrous texture or a part thereof corresponding to a zone known as the "retention zone" where impact with a blade or blade fraction is likely to occur.

Figure 6:
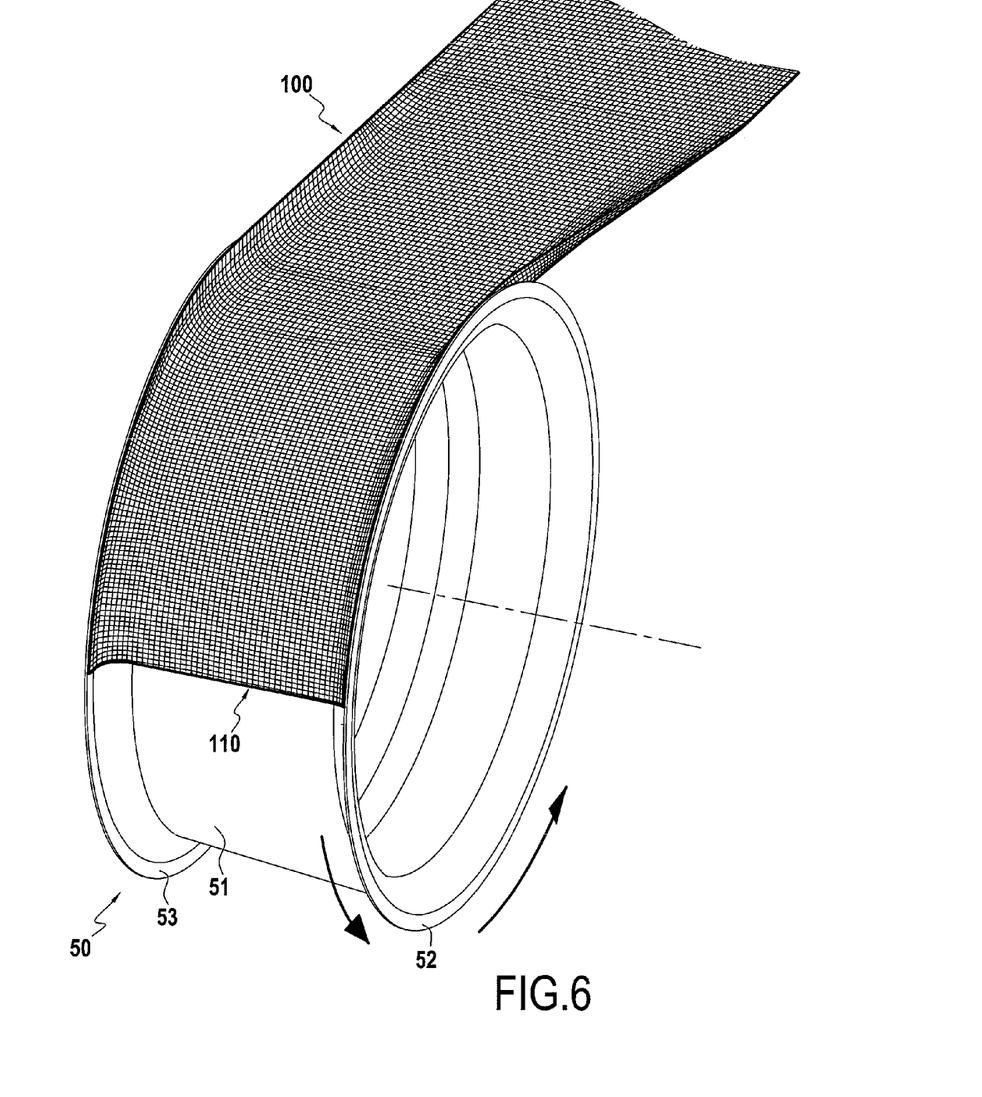
FIG. 6 is a schematic perspective view showing the winding of a fibrous texture on a forming tool.

As shown in FIG. 6, a fibrous casing reinforcement is formed by winding on a mandrel 50 of the previously described fibrous texture 100, the fibrous reinforcement constituting a complete tubular fibrous preform of a one-piece casing. To this end, the mandrel 50 has an outer surface 51 whose profile corresponds to the inner surface of the casing to be produced. The mandrel 50 also has two flanges 52 and 53 to form parts of the fibrous preform 62 and 63 corresponding to the flanges of the casing (the flanges 62 and 63 are visible in FIG. 7). The turn(s) located radially toward the interior of the preform correspond to the first portion P1 of the fibrous texture and the turn(s) located radially toward the exterior of the preform correspond to the second portion P2 of the fibrous texture.

FIG. 7 shows a sectional view of the fibrous preform 60 obtained after winding the fibrous texture 100 in several layers on the mandrel 50. The number of layers or turns is a function of the desired thickness and the thickness of the fibrous texture. It is preferably at least equal to 2. In the example described here, the preform 60 comprises 4 layers of fibrous texture 100.

The densification of the fibrous preform 60 with a matrix is then carried out.

The densification of the fibrous preform consists in filling the porosity of the preform, in all or part of its volume, with the material constituting the matrix.

The matrix can be obtained in a manner known per se following the liquid process. The liquid process consists in impregnating the preform with a liquid composition containing an organic precursor of the matrix material. The organic precursor is usually in the form of a polymer, such as a resin, optionally diluted in a solvent. The fibrous preform is placed in a mold that can be sealed with a housing in the shape of the final molded part. As shown in FIG. 8, the fibrous preform 60 is placed between a plurality of sectors 54 forming a counter-mold and the mandrel 50 forming a support, these elements having respectively the outer and inner shape of the casing to be made. The liquid matrix precursor, for example a resin, is then injected into the entire housing to impregnate the preform.

The transformation of the precursor into organic matrix, namely its polymerization, is carried out by heat treatment, generally by heating the mold, after removal of any solvent and crosslinking of the polymer, the preform being always held in the mold with a shape corresponding to that of the part to be made. The organic matrix can be obtained in particular from epoxy resins, such as, for example, the high-performance epoxy resin sold, or from liquid precursors of carbon or ceramic matrices.

In the case of the formation of a carbon or ceramic matrix, the heat treatment consists in pyrolyzing the organic precursor to transform the organic matrix into a carbon or ceramic matrix depending on the precursor used and the pyrolysis conditions. By way of example, liquid carbon precursors can be resins with a relatively high coke content, such as phenolic resins, while liquid ceramic precursors, in particular SiC, can be polycarbosilane (PCS), polytitanocarbosilane (PTCS) or polysilazane (PSZ) type resins. Several consecutive cycles, from impregnation to heat treatment, can be carried out to achieve the desired degree of densification.

The densification of the fibrous preform can be carried out by the well-known resin transfer molding (RTM) process. According to the RTM process, the fibrous preform is placed in a mold with the shape of the casing to be produced. A thermosetting resin is injected into the internal space between the rigid material part and the mold and which contains the fibrous preform. A pressure gradient is generally established in this internal space between the place where the resin is injected and the resin's evacuation ports in order to control and optimize the impregnation of the preform by the resin.

The resin used can be, for example, an epoxy resin. Resins suitable for RTM processes are well known. They preferably have a low viscosity to facilitate their injection into the fibers. The choice of the temperature class and/or the chemical nature of the resin is determined according to the thermomechanical stresses to which the part must be subjected. Once the resin has been injected into the entire reinforcement, its polymerization is carried out by heat treatment in accordance with the RTM process.

After injection and polymerization, the part is demolded. The part is finally turned to remove the excess resin and the chamfers are machined to obtain a casing 810 with a shape of revolution as shown in FIG. 9.

Figure 9:
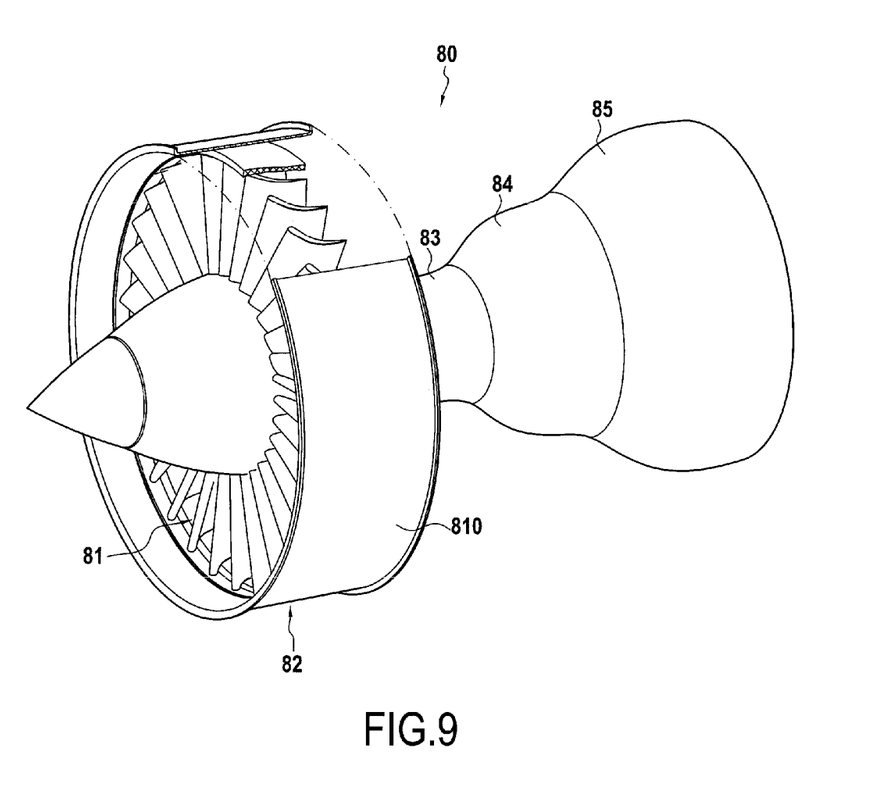
FIG. 9 is a perspective view of an aircraft engine in accordance with an embodiment of the invention.

The casing 810 shown in FIG. 9 is a casing for a gas turbine aircraft engine 80 blower. Such an engine, as shown very schematically in FIG. 8, comprises, from upstream to downstream in the direction of the gas flow, a blower 81 arranged at the engine inlet, a compressor 82, a combustion chamber 83, a high-pressure turbine 84 and a low-pressure turbine 85. The engine is housed inside a casing comprising several parts corresponding to different engine components. For example, the blower 81 is surrounded by the casing 810.

Figure 10:
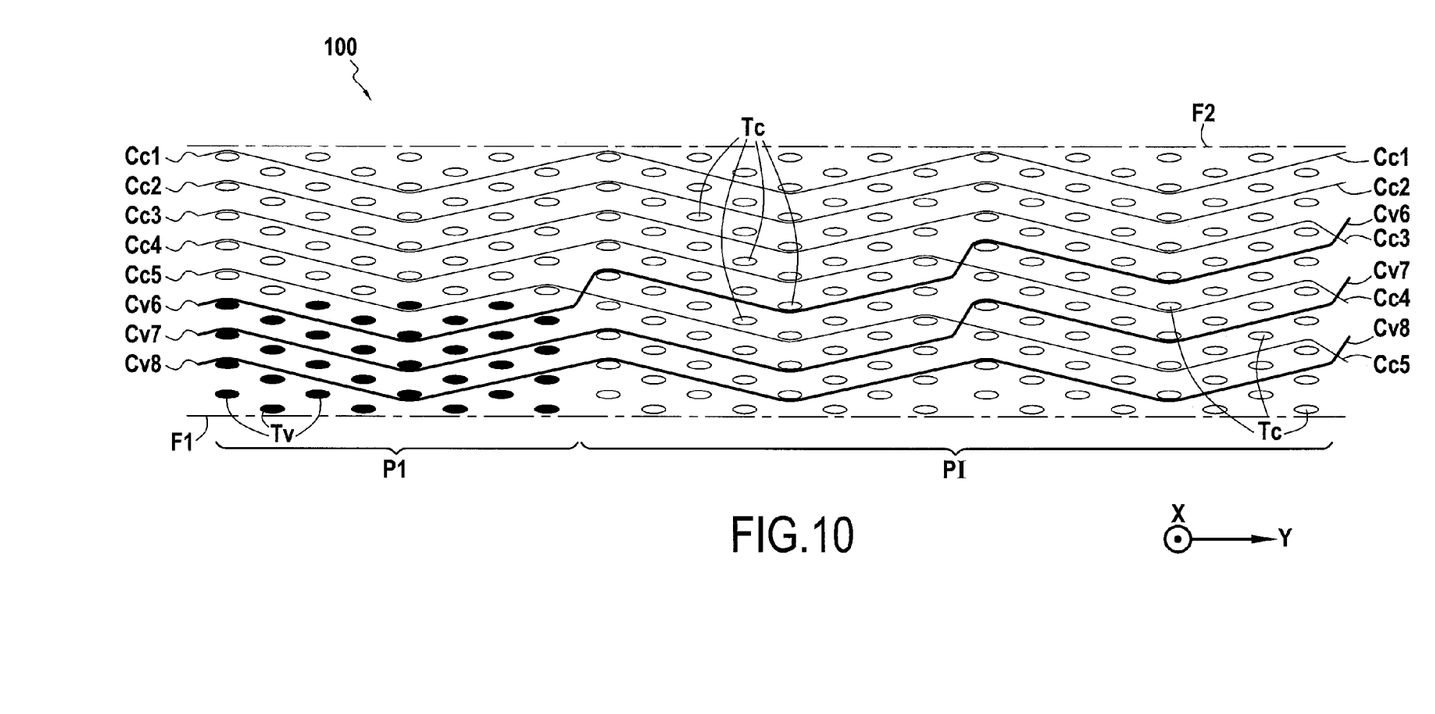
FIG. 10 is a longitudinal section taken at the first portion and part of the intermediate portion of a fibrous texture variant according to the invention and showing a weave plane.
Figure 11:
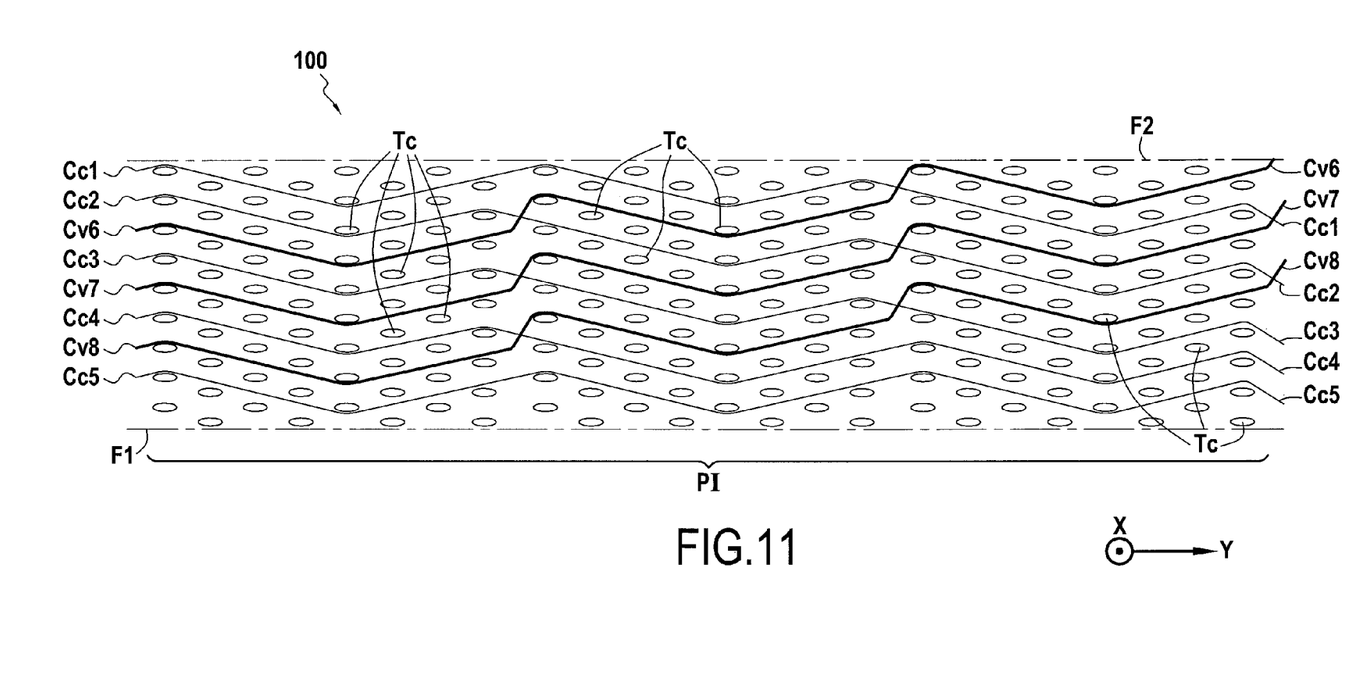
FIG. 11 is a longitudinal section taken at the intermediate portion of this fibrous texture variant and showing a weave pattern.
Figure 12:
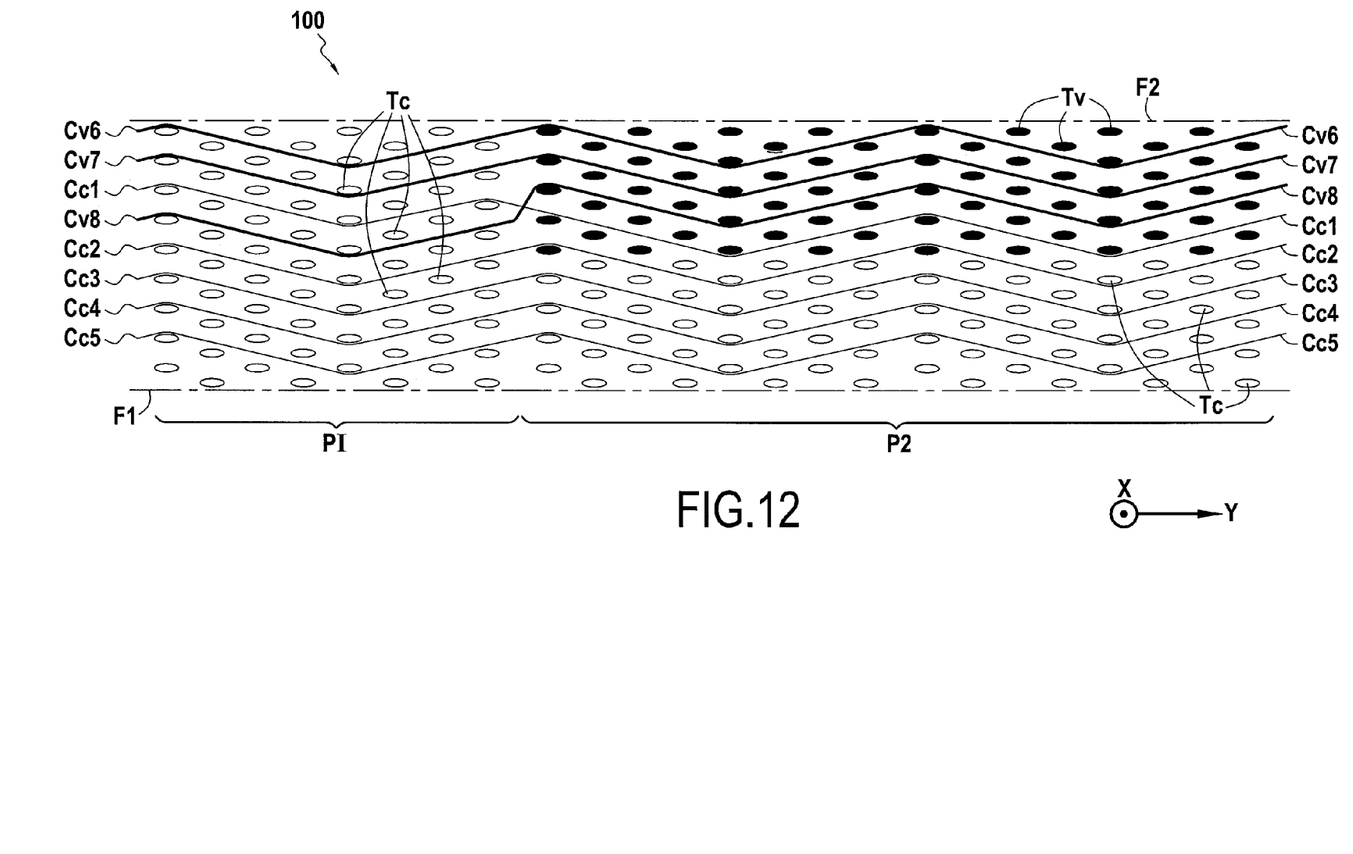
FIG. 12 is a longitudinal section taken at part of the intermediate and second portion of this fibrous texture and showing a weave plane.

FIGS. 10 to 12 show a variant of the fibrous texture 200 according to the invention, in which certain weft threads or strands are made of glass fibers (weft threads or strands Tv). More precisely, in FIG. 10 the first portion P1 comprises five layers of warp threads or strands present on the side of the outer face F2 of the fibrous texture 200 comprising threads or strands of carbon fibers Cc1 to Cc5 and three layers of warp threads or strands present on the side of the inner face F1 of the fibrous texture comprising threads or strands of carbon fibers Cv6 to Cv8. Moreover, the first four layers of weft threads or strands present on the side of the inner face F1 of the fibrous structure comprise weft threads or strands of glass fibers denoted Tv whereas the other layers of weft threads or strands present on the side of the outer face F2 of the fibrous texture 200 comprise threads or strands of carbon fibers denoted Tc.

Once in the intermediate portion PI, the weaving is piloted so as to make the warp threads or strands of glass fibers Cv6 to Cv8 gradually rise toward the outer face F2 of the fibrous texture by crossing with warp threads or strands of carbon fibers Cc1 to Cc5. In the intermediate portion PI, all of the layers of weft threads or strands comprise threads or strands of carbon fibers Tc (FIGS. 10 to 12).

In FIG. 12, the second portion P2 consists of five layers of warp threads or strands present on the side of the inner face F1 of the fibrous texture 100 comprising the warp threads or strands of carbon fibers Cc1 to Cc5 and three layers of warp threads or strands present on the side of the outer face F2 of the fibrous texture 100 comprising the warp threads or strands of carbon fibers Cv6 to Cv8. Moreover, the first four layers of weft threads or strands present on the side of the outer face F2 of the fibrous structure comprise weft threads or strands of glass fibers denoted Tv while the other layers of weft threads or strands present on the side of the inner face F1 of the fibrous texture 200 comprise threads or strands of carbon fibers denoted Tc.

The invention claimed is:

1. A fibrous texture in the form of a web extending in a longitudinal direction over a determined length between a proximal part and a distal part and in a lateral direction over a determined width between a first lateral edge and a second lateral edge, the fibrous texture having a three-dimensional or multilayer weave between a plurality of layers of warp threads or strands extending in the longitudinal direction and a plurality of layers of weft threads or strands extending in the lateral direction, wherein the fibrous texture comprises a first portion present in the longitudinal direction between the proximal part and an intermediate part, one or more layers of warp threads or strands present on the side of an inner face of the fibrous texture at least partly comprising threads or strands of glass fibers, the threads or strands of the other layers of warp threads or strands comprising threads or strands of carbon fibers, and wherein the fibrous texture further comprises a second portion present in the longitudinal direction between the intermediate part and the distal part of said fibrous texture, one or more of the plurality of layers of warp threads or strands present on the side of an outer face of the fibrous texture at least partly comprising threads or strands of glass fibers, the threads or strands of the other layers of the plurality of layers of warp threads or strands comprising threads or strands of carbon fibers, the warp threads or strands being continuous over the entire length of the fibrous texture.

2. The texture as claimed in claim 1, wherein the warp threads or strands of glass fibers present on the side of the inner face of the fibrous texture in the first portion rise gradually toward the outer face of the fibrous texture in the intermediate part so as to be present on the side of the outer face of said texture in the second portion.

3. The fibrous texture as claimed in claim 1, wherein one or more of the plurality of layers of weft threads or strands present on the side of the inner face of the fibrous texture in the first portion are constituted of threads or strands of glass fibers, the threads or strands of the other layers of the plurality of layers of weft threads or strands being constituted of threads or strands of carbon fibers.

4. The fibrous texture as claimed in claim 1, wherein one or more of the plurality of layers of weft threads or strands present on the side of the outer face of the fibrous texture in the second portion are constituted of threads or strands of glass fibers, the threads or strands of the other layers of the plurality of layers of weft threads or strands being constituted of threads or strands of carbon fibers.

5. A fibrous preform for an aircraft casing comprising a winding in several turns of the fibrous texture as claimed in claim 1, the first portion being located on the side of a radially inner face of the preform, and the second portion being located on the side of a radially outer face of the preform.

6. A casing for a gas turbine made of a composite material, comprising a fibrous reinforcement consisting of the fibrous preform as claimed in claim 5, and a matrix densifying the fibrous reinforcement.

7. The casing as claimed in claim 6, wherein said casing is a gas turbine blower casing.

8. A gas turbine aircraft engine having the casing as claimed in claim 6.

9. A process for manufacturing a fibrous texture by three-dimensional or multilayer weaving between a plurality of layers of warp threads or strands extending in a longitudinal direction and a plurality of layers of weft threads or strands extending in the lateral direction, the fibrous structure in the form of a web extending in the longitudinal direction over a determined length between a proximal part and a distal part and in the lateral direction over a determined width between a first lateral edge and a second lateral edge, the method comprising weaving a first portion present in the longitudinal direction between the proximal part and an intermediate part, one or more layers of warp threads or strands present on the side of an inner face of the fibrous texture at least partly comprising threads or strands of glass fibers, the threads or strands of the other layers of warp threads or strands comprising threads or strands of carbon fibers, and weaving a second portion present in the longitudinal direction between the intermediate part and the distal part of said fibrous texture, one or more of the plurality of layers of warp threads or strands present on the side of an outer face of the fibrous texture at least partly comprising threads or strands of glass fibers, the threads or strands of the other layers of the plurality of layers of warp threads or strands comprising threads or strands of carbon fibers, the warp threads or strands being continuous over the entire length of the fibrous texture.

10. The process as claimed in claim 9, wherein the warp threads or strands of glass fibers present on the side of the inner face of the fibrous texture in the first portion gradually rise toward the outer face of the fibrous texture in the intermediate part so as to be present on the side of the outer face of said texture in the second portion.

11. The process as claimed in claim 9, wherein one or more of the plurality of layers of weft threads or strands present on the side of the inner face of the fibrous texture in the first portion are constituted of threads or strands of glass fibers, the threads or strands of the other layers of the plurality of layers of weft threads or strands being constituted of threads or strands of carbon fibers.

12. The process as claimed in claim 9, wherein one or more layers of the plurality of layers of weft threads or strands present on the side of the outer face of the fibrous texture in the second portion are constituted of threads or strands of glass fibers, the threads or strands of the other layers of the plurality of layers of weft threads or strands being constituted of threads or strands of carbon fibers.

* * * * *